United States Patent [19]

Gill et al.

[11] 4,177,851

[45] Dec. 11, 1979

[54] FOLDABLE SPARE TIRE

[75] Inventors: Michael L. Gill, Akron; William M. Hopkins, Tallmadge, both of Ohio

[73] Assignee: The Goodyear Tire & Rubber Company, Akron, Ohio

[21] Appl. No.: 869,883

[22] Filed: Jan. 16, 1978

Related U.S. Application Data

[63] Continuation of Ser. No. 666,852, Mar. 15, 1976, abandoned.

[51] Int. Cl.² .............................................. B60C 5/00
[52] U.S. Cl. ........................... 152/353 R; 152/354 R; 152/362 R
[58] Field of Search .............. 152/352, 353 R, 353 C, 152/330 R, 330 RF, 362 R, 362 CS, 354 R, 374; 156/123, 131, 132; 425/31, 32, 39, 44

[56] References Cited

U.S. PATENT DOCUMENTS

| | | | |
|---|---|---|---|
| 1,530,574 | 3/1925 | Paull | 152/354 |
| 2,650,633 | 9/1953 | Eger | 152/354 |
| 2,971,553 | 2/1961 | Woodall | 152/362 R |
| 3,302,681 | 2/1967 | Travers | 152/362 R |
| 3,394,750 | 7/1968 | Tatarzycki | 152/330 R |
| 3,610,310 | 10/1971 | Wittneben | 152/352 |

Primary Examiner—Francis J. Bartuska
Attorney, Agent, or Firm—R. S. Washburn

[57] ABSTRACT

Tendency of a tire bead core to be rotated by the tire ply wrapped around the core, when the tire is expanded from a cylindrical or collapsed state to its normal toroidal operating state, particularly after the tire is cured, is inhibited, or eliminated by arrangement of the ply relative to the bead core which disposes the ply tension force direction at or nearly at the bead core center.

The foregoing abstract is not to be taken as limiting the invention of this application, and in order to understand the full nature and extent of the technical disclosure of this application, reference must be made to the accompanying drawing and the following detailed description.

4 Claims, 9 Drawing Figures

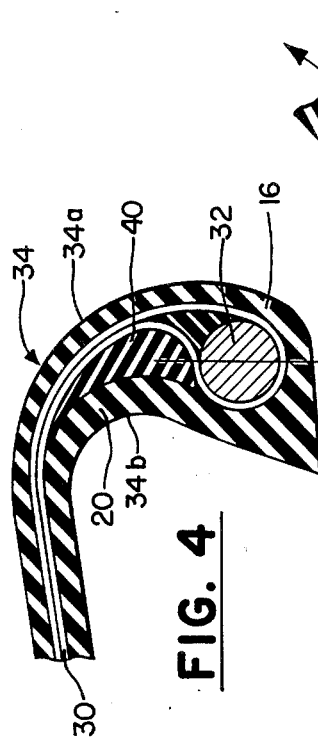
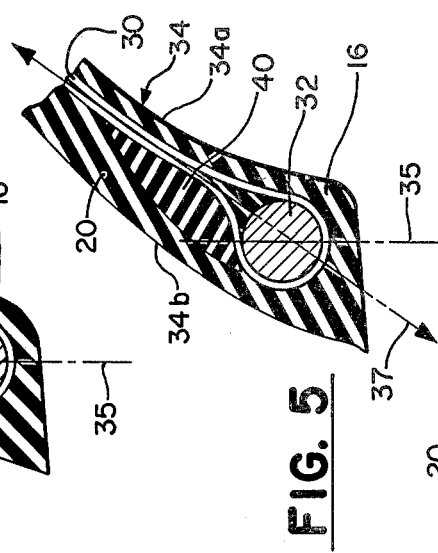
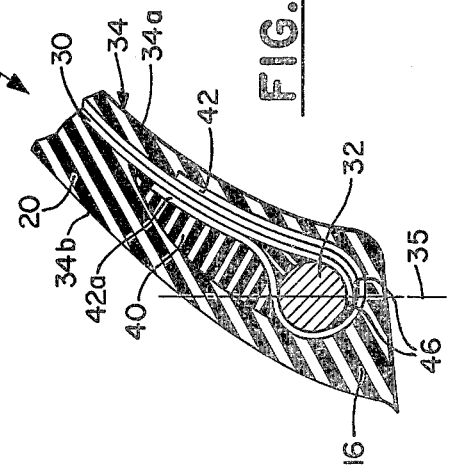
FIG. 4
FIG. 5
FIG. 6
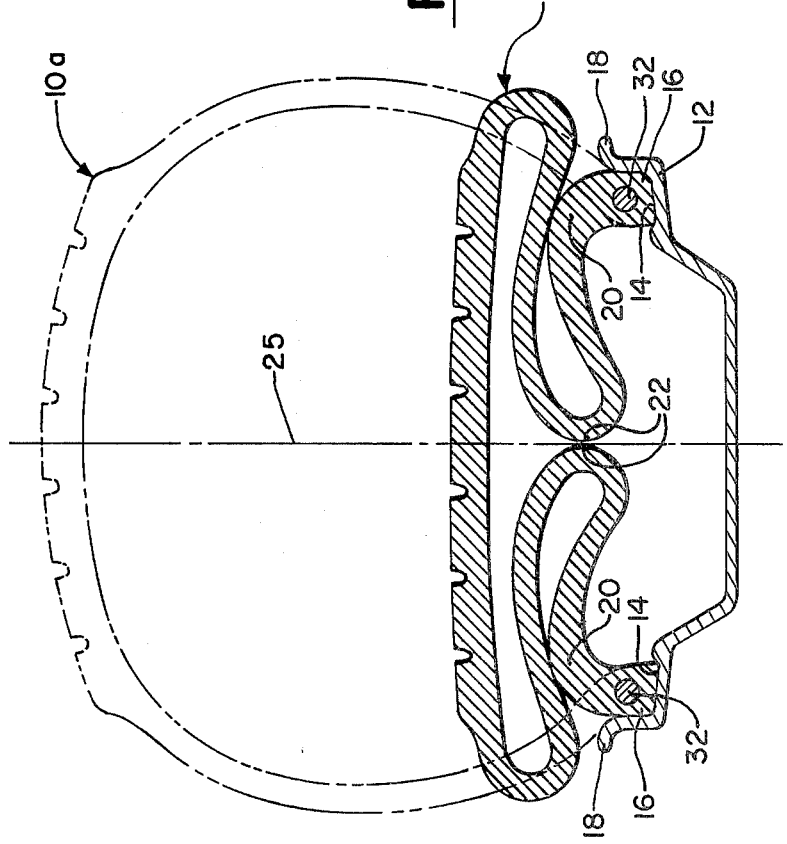
FIG. 1
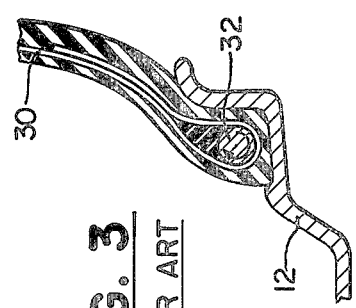
FIG. 3
PRIOR ART
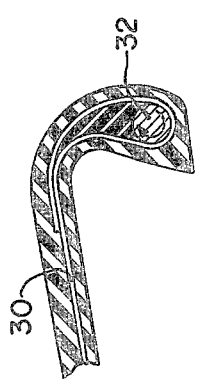
FIG. 2
PRIOR ART

FOLDABLE SPARE TIRE

This is a continuation of application Ser. No. 666,852, filed Mar. 15, 1976, now abandoned.

This invention relates to pneumatic tires and particularly to a foldable tire having an outside diameter smaller when deflated for stowage and greater when inflated for use.

Tires of the foldable type with which the present invention is concerned find particular utility as spare tires for passenger cars by occupying materially less space than a conventional passenger car tire.

The objective of the invention is to provide a tire, and a method for producing such tire, in which the parasitic stress in the bead cores is reduced with respect to the stress in the bead cores of tires in accordance with the prior art.

Broadly, the invention comprises a pneumatic tire having a diameter smaller when deflated for stowage and greater when inflated for use, the tire having a tread, two beads, and foldable sidewalls each having an inward surface and an outward surface, the sidewalls respectively connecting said beads with said tread, said sidewalls each having a region adjacent the respective bead which region is subject to reverse flexure on inflation of the tire, the tire comprising a bead core in each bead and at least one ply extending circumferentially of and between the two bead cores, and characterized in that said ply in each respective region is disposed closer to the outward surface than to the inward surface of said sidewall in such region.

In a parallel aspect, the invention, broadly, comprises a foldable tire having beads and sidewall portions adjacent the beads which portions are subject to reversing flexure and having an inextensible bead core in each respective bead which cores are spaced apart along and coaxially about a tire rotation axis, at least one reinforcement cord ply having a reach connecting said bead cores and endings turned respectively about said cores, said reach in said regions while in the deflated state of the tire extending outward from the respectively associated bead core radially and axially initially from beyond the mid-plane of such bead core and thence axially inwardly.

In a further aspect the invention provides a method of building a foldable tire comprising building a tire carcass including a pair of tire bead cores and at least one reinforcing cord ply extending in cylindrical form therebetween, turning the ends of the ply about the respectively associated bead cores, and arranging each said bead core relative to the respectively adjacent portion of the ply such that the ply extends from its wrapping relation with the bead core initially axially outward of the mid-plane of the bead core, and then maintaining the disposition of said portion so arranged while molding and curing the tire, whereby on inflating the tire, said portion of the ply exerts minimal rotational moment in the respectively associated bead core.

To acquaint persons skilled in the art with the principles of the invention, certain presently preferred embodiments illustrative of the best mode now contemplated for the practice of the invention are described making reference to the attached drawings forming a part of this specification and in which drawings:

FIG. 1 is an axial cross-section of a foldable tire constructed in accordance with the present invention and illustrating the tire in its deflated stowable state, and in phantom outline the tire in its inflated and expanded state for use;

FIG. 2 is an axial cross-section of a bead and adjacent sidewall portion of a foldable tire in accordance with the prior art, in the folded condition thereof;

FIG. 3 is an illustration in axial cross-section of the bead and sidewall portion of FIG. 2 in its inflated, expanded state;

FIG. 4 is an axial cross-section view illustrating the bead and adjacent sidewall portion of the tire of FIG. 1 in its deflated state;

FIG. 5 illustrates in axial cross-section, the bead and adjacent sidewall portion of the tire of FIG. 1 in its inflated state;

FIG. 6 illustrates in axial cross-section an alternative construction in accordance with the invention of the bead and adjacent sidewall portion of a foldable tire in its expanded state;

Figure 7:
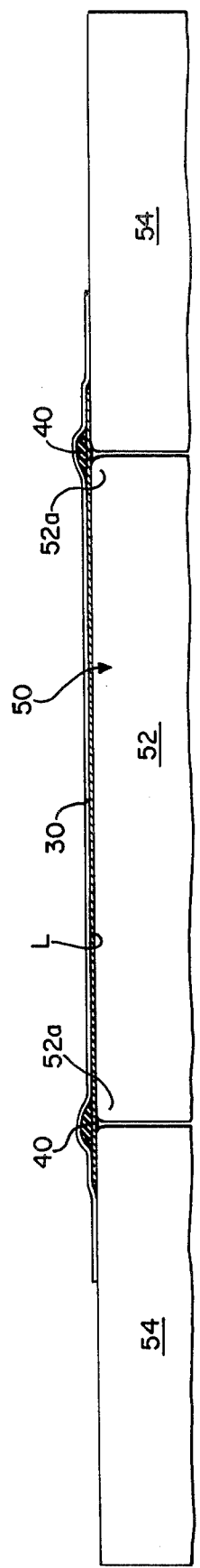
Figure 8:
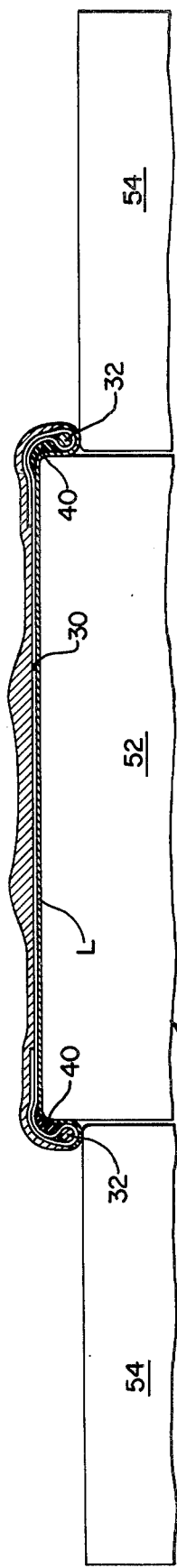
Figure 9:
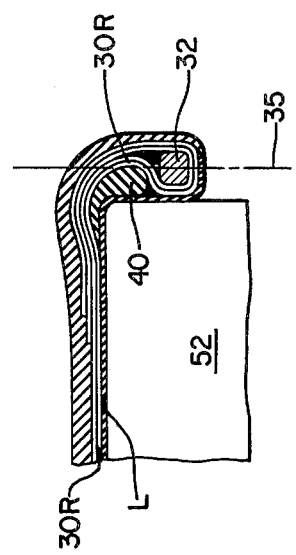

FIGS. 7, 8, and 9 illustrate sequential steps of the method in accordance with the invention for building the tire of FIG. 1.

FIG. 1 shows a foldable tire 10 in its deflated folded state mounted on a conventional rim 12. The rim provides seats 14 which accommodate the beads 16 of the tire and flanges 18 holding the respective beads in their axial locations. When mounted on its rim 12, the tire assumes the cross-sectional shape illustrated. When inflated to the usual tire operating pressure, for example, about 2 kilograms per square centimeter ($\pm$ about 10 percent), the tire expands to the shape 10a and outside diameter indicated for use as a temporary substitute tire on a vehicle.

Upon consideration of the change in shape illustrated in FIG. 1, it will be observed that the sidewall region 20 close to the bead 16 of the tire undergoes a reverse flexure in which the curvature of that portion of the sidewall about a center of curvature located inward of the bead changes to a curvature about a center axially outward of the bead.

The folds 22 of the sidewall disposed close to the mid-circumferential plane 25 of the tire and which, when the tire is inflated, lie at or near the maximum section width of the tire, also undergo a reverse flexure during the change from deflated to inflated state. The reverse flexure experienced by these folds is not considered in the subject matter or within the scope of the present invention.

Referring to FIG. 2, the typical arrangement of the relation of the tire ply with the bead core in the bead of the conventional folded tire, it will be observed that when the conventional tire is inflated, changing its state from that illustrated in FIG. 2 to that illustrated in FIG. 3, the ply 30 tends to be severely elongated and in turn applies a rotational moment to the cross-section of the bead core 32 as illustrated in FIGS. 2 and 3. This moment tends to rotate each axial cross-section of the bead clockwise as seen in FIGS. 2 and 3. The effect may be considered as an attempt to turn the bead core inside out. This rotation or turning moment effect tends to be greater in foldable than in conventional tires. Rotation of the bead tends to increase stress in some of the wires of the bead, and decrease stress in other wires. As a result of such unequal distribution of stress among the single wires of the bead, the bead has at least theoretically less ability to support the hoop stresses imposed in the bead by normal inflation of the tire.

Referring now to FIGS. 4 and 5, in accordance with the present invention the described tendency to exert rotational moment on the bead core 32 is reduced and even overcome by the construction of the bead 16 and adjacent sidewall 34, and particularly the region of reverse flexure 20. It will be observed that the reinforcement cord ply or plies 30 which connect the bead cores in the tire is displaced axially outward of a mid-plane 35 of the bead core which plane is normal to the tire axis (not shown). The bead core is arranged relative to the ply 30 such that the ply, or plies, conforms to the shape of the bead core in section and in the region of maximum flexure is closer to the outward surface 34a of the sidewall than to the inner surface 34b of the sidewall. As the tire is inflated from the state of FIG. 4 to the fully shaped state of FIG. 5, the ply 30 is elongated less or not at all in contrast to the condition described with respect to FIGS. 2 and 3.

FIGS. 4 and 5 illustrate further a particularly preferred embodiment in which a formed ring 40 of a rubber compound or equivalent provides a ply positioning element which is disposed in concentric surrounding coplanar relation about the bead core and lies axially inward of the ply 30 so as to position the ply relative to the bead core 32 in the manner described. The ply thus positioned conforms to the shape of the bead core inward of the mid-plane 35 and to the shape of the positioning element in the flexure region to form an S-curve so that the ply is displaced outwardly of the thickness of the sidewall to lie closer to the outward surface 34a than to the inward surface 34b and extends from or into its wrapping relation with the bead core at a location outward of the mid-plane of the core.

Referring particularly to FIG. 5, it will be observed that elongation of the ply 30 can cause some axial displacement of the sidewall material but cannot communicate a rotational moment to the bead core 32 and that moreover tension in the ply due to the inflation of the tire acts along a line of action represented by the arrow 37 which passes close to or through the actual center of the bead core cross-section, thus exerting no significant rotational moment.

The ply positioning element 40 having served in the building of the tire to position the ply relative to the bead core, is cured integrally in the bead and flexure region along with the tire and remains in the cured tire and can be distinguished therein by its relatively greater hardness than the surrounding sidewall material.

In FIG. 6, a further embodiment according to the invention is illustrated of the bead 16 and adjacent sidewall 34 including the region of reverse flexure 20 of the tire of FIG. 1. In this embodiment the ply or plies 30 extend into wrapping relation with the bead core 32 initially on the side of the bead core 32 axially outwardly of its mid-plane 35 and terminate at the radially inward side of the bead core. The tire of FIG. 6 further includes a flipper 42 which overlies the ply and is turned about the bead core. One portion 42a of the flipper extends radially of the bead core in coherent overlying relation with the axially inward surface of the ply 30. A ply positioning element, a ring 40 like the element described in connection with FIGS. 4 and 5, is disposed in surrounding concentric relation with the bead core 32 axially inwardly of the portion 42a of the flipper such that the flipper passes from its contact with the ply and thence between the positioning ring 40 and the bead core 32 entering its wrapping relation with the bead core axially outwardly of the mid-plane 35. From this point the flipper 42 wraps about the bead core and about the terminal edges 46 of the plies 30 and extends radially in coherent relation with the axially outward surface of the ply 30. The purpose and effect of the arrangement of FIG. 6 are, again, to reduce the tendency to exert a rotation moment on the bead by disposing the ply closer to the outward surface 34a of the sidewall than to the inward surface 34b and to arrange the ply to initially enter its wrapping relation with the bead core axially outward of the mid-plane 35 of such bead core.

In FIGS. 7, 8, and 9, the method of building the foldable tire in accordance with the present invention is illustrated schematically. In FIG. 7, the customary tire liner L is wrapped first about a conventional building drum 50 having a center portion 52 and two end portions 54. Annular ply positioning elements in the form of rings 40 of a suitable rubber compound are then positioned circumferentially about the center drum 52 at the extremities 52a and 52b thereof. The ply or plies 30 are then wrapped about the drum and about the positioning rings so that the rings 40 are disposed between the liner L and the ply 30 at the shoulders of the drum. Then, as is illustrated in FIG. 8, the center portion 52 is increased in diameter so as to form shoulders for locating the bead cores 32. As may be seen in FIG. 8, the positioning rings 40 form with the drum a protuberance at each shoulder which cooperates with the bead core 32 when the latter is urged into the position shown such that the ply is displaced into the previously described S-curve in which that portion of the ply in the region of reverse flexure is displaced axially outwardly relative to the mid-plane of the bead core.

The auxiliary drums 54 are then expanded in the customary manner to turn the ply endings outwardly around and over the bead cores to enclose the bead cores in the ends of the tire carcass. Thus, the bead of the uncured tire is formed as illustrated in FIG. 9 wherein the plies of the ply reach 30R between the bead cores and particularly in the region of reverse flexure are formed outwardly about the contour of the positioning ring 40 and thence axially inwardly between the positioning ring 40 and the bead core 32 and enter the wrapping relation with the bead core at or axially outwardly of the mid-plane 35 of the core. The ply ends are then turned outwardly about the core to overlie the ply between the bead cores. Subsequently, as is indicated in FIG. 8, tread and sidewall stock are wrapped about the carcass. The tire thus formed is then removed and inserted in a tire curing mold wherein the tire is molded and cured.

While certain representative embodiments and details have been shown for the purpose of illustrating the invention, it will be apparent to those skilled in the art that various changes and modifications may be made therein without departing from the spirit or scope of the invention.

What is claimed is:

1. An inflatable tire having a tread, sidewalls, and beads, said tread having, when the tire is deflated, a diameter materially smaller than when it is inflated, said tire comprising an endless inextensible bead core in each of said beads, at least one ply of reinforcing cords extending to and between said bead cores, and means reducing the parasitic stress in each bead core comprising an annular ply positioning element disposed in concentric surrounding coplanar relation about each bead core and axially inward of the or each said ply in the respectively associated bead, the or each ply in the bead region being extended from the bead core outwardly of the mid-plane of the bead core, in the deflated state of the tire.

2. A tire as claimed in claim 1, said element comprising a precured rubber compound.

3. A tire as claimed in claim 1, wherein said at least one ply extends around the axially outward side of said element, between the element and the associated bead core and thence around the axially inward side of the bead core.

4. A tire as claimed in claim 1, wherein said at least one ply is disposed axially outward of the associated bead core and terminates adjacent the radially inward surface thereof and further comprising a flipper overlying said ply about the bead and extending between the bead core and said element.

* * * * *